Sept. 24, 1968

J. D. BROCK 3,402,476

CROP-DRYING METHOD

Original Filed Aug. 23, 1965

INVENTOR
James Donald Brock

Sept. 24, 1968 J. D. BROCK 3,402,476
CROP-DRYING METHOD
Original Filed Aug. 23, 1965 8 Sheets-Sheet 2

INVENTOR
James Donald Brock

Sept. 24, 1968    J. D. BROCK    3,402,476
CROP-DRYING METHOD
Original Filed Aug. 23, 1965    8 Sheets-Sheet 4

INVENTOR
James Donald Brock

Sept. 24, 1968 J. D. BROCK 3,402,476
CROP-DRYING METHOD
Original Filed Aug. 23, 1965 8 Sheets-Sheet 6

INVENTOR
James Donald Brock

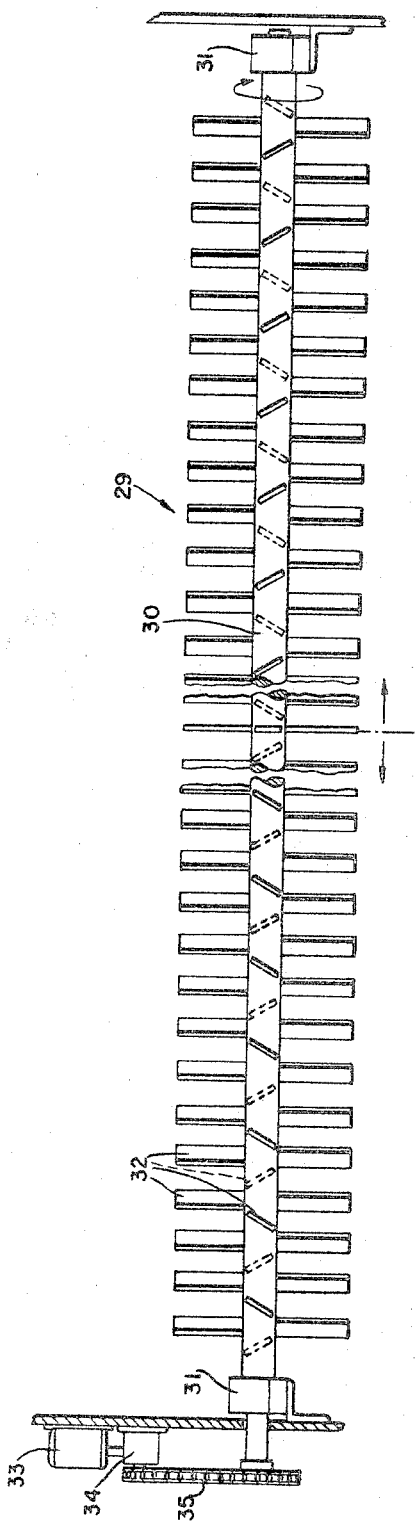
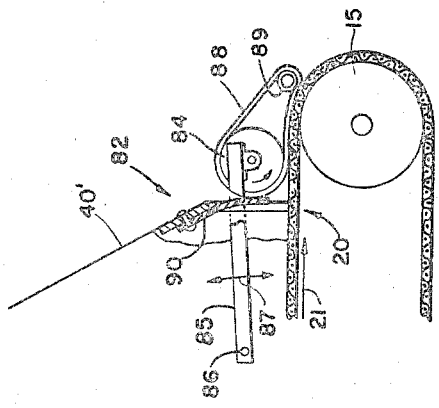
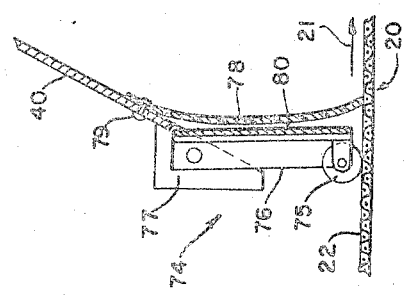
INVENTOR
James Donald Brock

Sept. 24, 1968 J. D. BROCK 3,402,476
CROP-DRYING METHOD
Original Filed Aug. 23, 1965 8 Sheets-Sheet 8

*INVENTOR*
James Donald Brock

United States Patent Office 3,402,476
Patented Sept. 24, 1968

3,402,476
CROP-DRYING METHOD
James Donald Brock, Chattanooga, Tenn., assignor to Industrial Boiler Company, Inc., Chattanooga, Tenn., a corporation of Tennessee
Original application Aug. 23, 1965, Ser. No. 481,731. Divided and this application Aug. 18, 1967, Ser. No. 661,573
2 Claims. (Cl. 34—28)

ABSTRACT OF THE DISCLOSURE

A method and apparatus for drying hay, or other similar farm crops, wherein the hay is placed on a moving conveyor belt, heated air is blown through the hay and the conveyor belt, and as the hay progresses through the area of heated air, the air becomes dryer and cooler so that the crop will not be scorched and so the air will have its maximum drying effect at the end of the travel of the conveyor belt.

Cross reference to related applications

This application is a divisional of my co-pending application Ser. No. 481,731, filed Aug. 23, 1965, now U.S. Patent No. 3,352,025.

Background of the invention

It is commonly knowledge that the farmer is at the mercy of the weather in harvesting his crops in that rain causes him to postpone the harvest, or in the event the crop has already been cut but not raked, postpone the raking and bailing of the crop. Also, in many instances a crop can be ruined if it is cut and laying on the ground and it rains before the crop can be dried and removed, as by gathering or bailing the crop.

Obviously, it is highly desirable for the farmer to harvest his crop at the peak of its nutritional value without regard to inclement weather, and after the crop is harvested, remove the crop immediately to its storage area without letting it lie on the ground in the sun to dry. This procedure is also advantageous in other aspects in that when a crop is left to dry in the sun on the ground, a substantial portion thereof is wasted since the forage and leaves, which are the most nutritious portion of the crop, become brittle due to their loss of moisture and fall away from the stalk onto the ground where they are not picked up by raking. By being able to harvest the crop at the peak of its growth period and by not leaving the crop on the ground where a substantial portion thereof is lost, approximately 20% more material can be retrieved in the harvest. Also, immediate removal of the crop is desirable since it has been found that leaving the harvested crop in the field to be dried by the sun causes a deterioration of the crop itself so that its food value is reduced. Thus, the farmer can produce a crop that is high in protein and vitamin A concentrates since the crop is harvested at its peak of nutritional value, the nutritional portion of the crop is not lost, and no additional vitamin A or protein concentrates are required for the diet of animals feeding on the harvested crop.

Summary of the invention

Accordingly, this invention comprises a crop drying method and apparatus that enables the farmer to harvest his crop without regard to inclement weather, immediately remove the crop from the field as it is cut, never allowing it to hit the ground, and artificially dry the crop. The crop is placed on a moving conveyor belt, uniformly spread over the conveyor belt, heated air blown through the crop and the conveyor belt, and the crop removed from the conveyor belt in a dried condition. As the crop travels along the flight of the conveyor belt the heated air near the beginning of the flight is of a temperature that would normally scorch a dried crop, however, the crop being moist prevents its scorching. As the crop travels further along the conveyor belt the air is increased in flow rate, reduced in temperature, below the crop's scorching temperature, and the humidity of the air is lowered so that the air has its maximum effectiveness on the crop throughout the travel of the conveyor.

Thus, it is an object of this invention to provide a method of drying crops that initially dries the crops at a temperature above the scorching temperature of the crop, and then at a temperature below the scorching temperature of the crop, while lowering the humidity and increasing the air flow rate of the drying medium throughout the process.

It is another object of this invention to provide a method of drying a crop wherein the crop is dried with a through-flow process with an initial high temperature, with the temperature and humidity of the air being lowered and the velocity of air traveling through the crop increased as the crop is dried, the same air being utilized several times in the drying process.

It is another object of this invention to provide an apparatus for drying crops with heated air, whereupon the air utilized is recirculated by a controlled recirculating system through the crop several times so as to maximize the efficiency of the drying operation.

Other objects, features and advantages will become apparent upon inspection of the following specification, taken in conjunction with the accompanying drawings, in which:

Brief description of the drawing

FIG. 7 is an other form of my invention, showing a device for turning the crop on the conveyor belt, as the crop travels through the crop dryer;
FIG. 8 is an elevational view of the spreader utilized with the crop dryer;
FIG. 9 is a partial elevational view of the crop dryer showing the inlet air seal;
FIG. 10 is a partial elevational view of the crop dryer, similar to FIG. 9, but showing the exit air seal.

Disclosure of the embodiment

Figure 1:
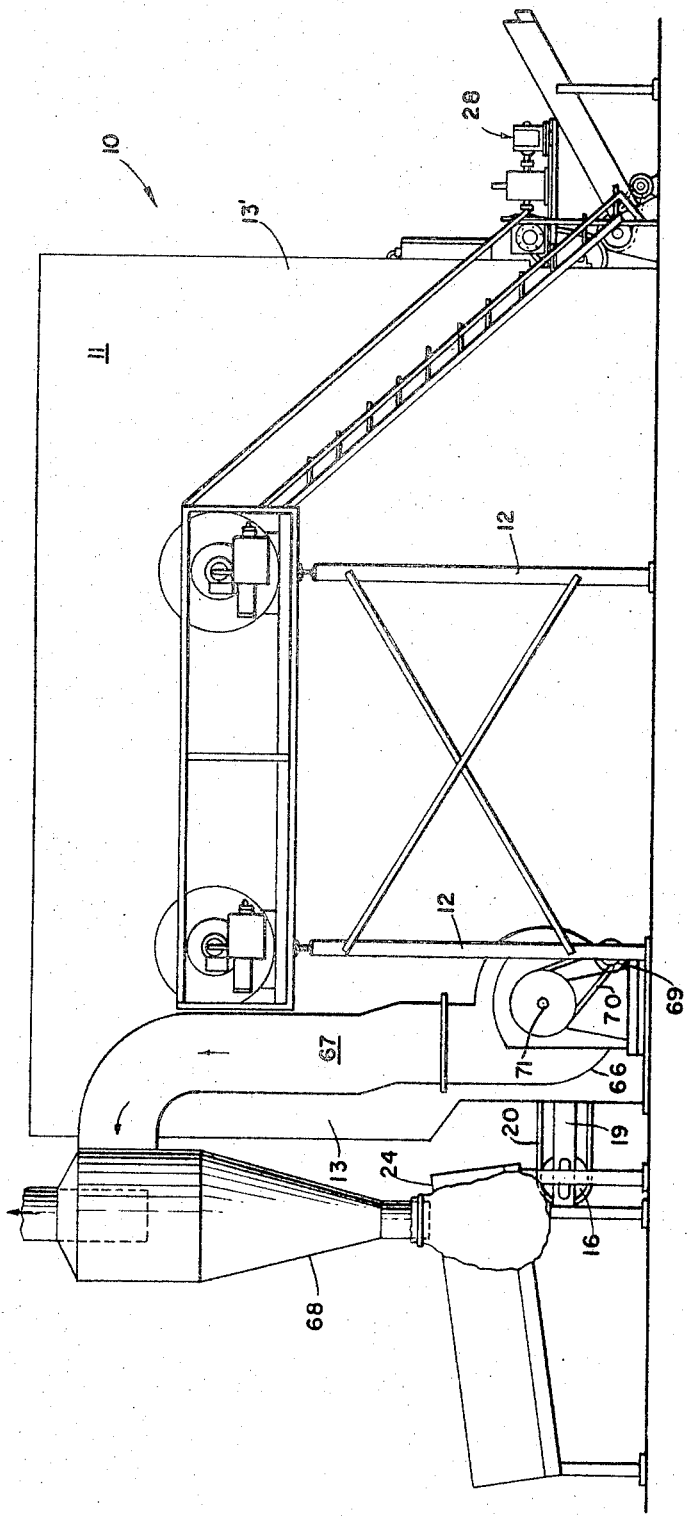
FIG. 1 is a side elevational view of the crop dryer.

Referring now more particularly to the drawings, wherein like numerals indicate identical parts and primed numerals indicate similar parts, the crop dryer 10 comprises an exterior casing 11, preferably formed of a heat impervious substance in order to minimize the heat loss from the crop dryer. The crop dryer and its frame 11 are supported on various WF-beams 12 which vary in dimensions according to the weight they support. The crop dryer is divided into a high temperaure side 13 and a low temperature side 13'.

Figure 3:
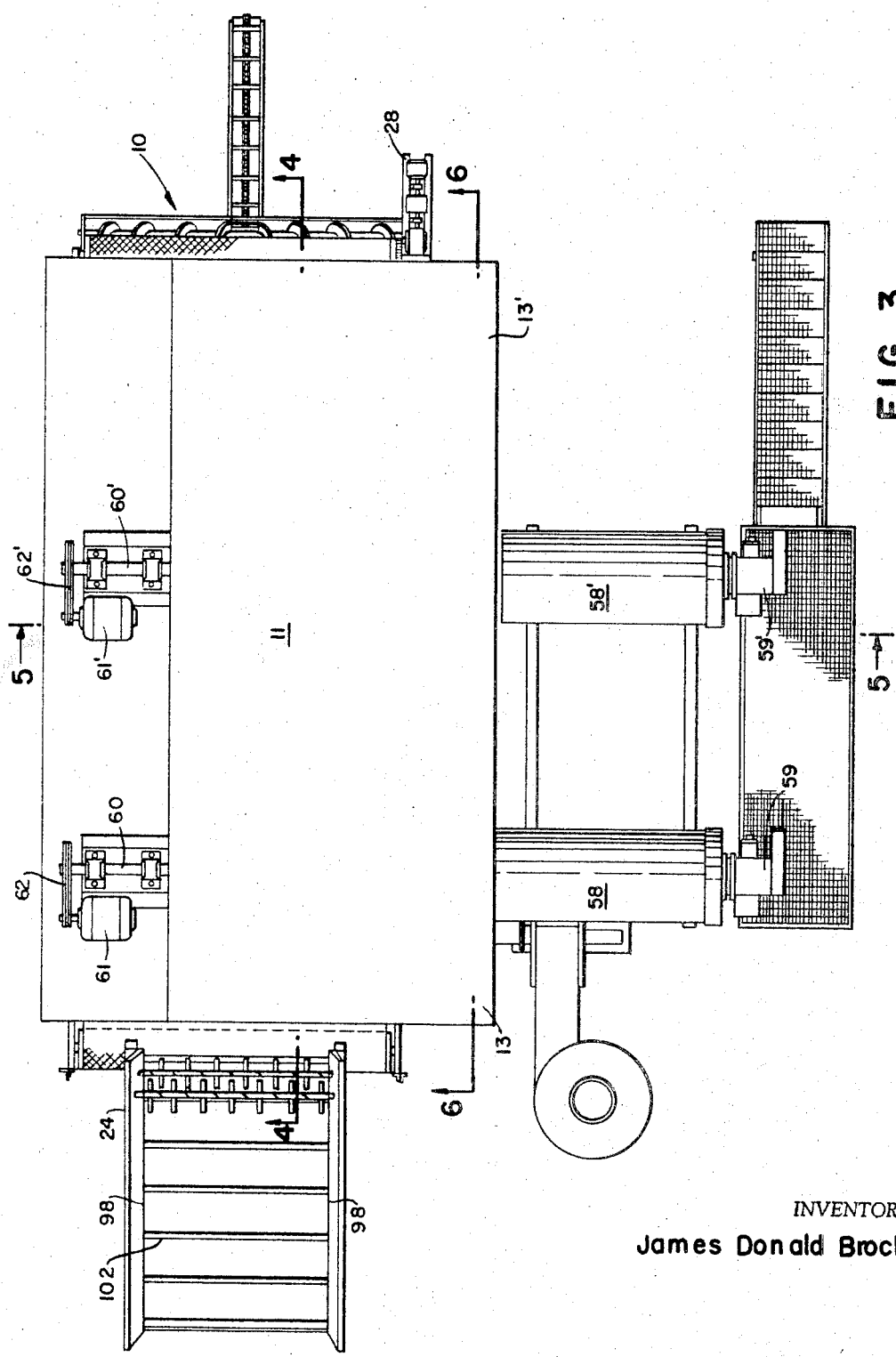
FIG. 3 is a top view of the crop dryer.

A conveyor mechanism 14 is located at the lower portion of the crop dryer, and comprises a driving roll 15, a driven roll 16, support rolls 17 beneath the conveying flight 22, and support rolls 18 beneath the return flight 23. The driven roll 16 can be adjusted in its distance from the driving roll 15 by the adjusting mechanism 19. The conveyor belt 20 extends through both the high temperature and low temperature sides and is an open mesh wire belt, of small weave, whereupon air can be easily blown through the belt but small particles will not easily pass therethrough. The conveyor belt 20 is driven in the direction of the arrows 21 by the driving roll, which is driven by the conventional variable speed power source 28 (FIGS. 1 and 3).

A feed conveyor 24 is positioned with one of its ends immediately above the driven roll 16 of the conveyor mechanism 14, and feeds the crop onto the conveyor belt 20.

A spreader 29 is adjustably positioned above the feed side of the conveyor belt 20, at the driven roll end of the conveyor belt. The spreader 29 comprises an axle 30 rotatably mounted at its ends in the bearings 31. A plurality of flat bars 32 are connected at one of their ends to the axle 30 along its length, and disposed 90° intervals therearound. Each of the bars 32 are disposed at an angle with respect to the longitudinal axis of the axle 30 with the bars on one end of the axle being disposed at an angle opposite to those on the other end of the axle so that as the axle rotates the bars 32 will contact the crop and cause the crop to be migrated away from the center of the conveyor belt 20, toward its edges, to insure that the crop is spread evenly over the conveyor belt 20, at an approximate uniform height. The adjustability of the spreader roller above the wire belt allows the operator to adjust the thickness of the grain on the conveyor belt. The spreader 29 is driven by the electric motor 33 through a gear reducer 34 and a conventional chain drive 35.

The housing 11 of the crop dryer contains various duct work that regulates the flow of air therein. Two reducers 40 and 40', of substantially identical configuration, are mounted immediately above the conveyor belt 20 in side-by-side relationship. The reducers 40 and 40' are rectangular in cross section and connected to the housing 10 along their side portions. The reducer 40, in the high temperature side of the crop dryer, is connected at its end adjacent the spreader roller 29 to the housing 10 at 41, and at its opposite end to the adjacent reducer 40'. The reducer 40', in the low tempeararue side, is connected at its end remote from the reducer 40 to the beams 12.

Figure 4:
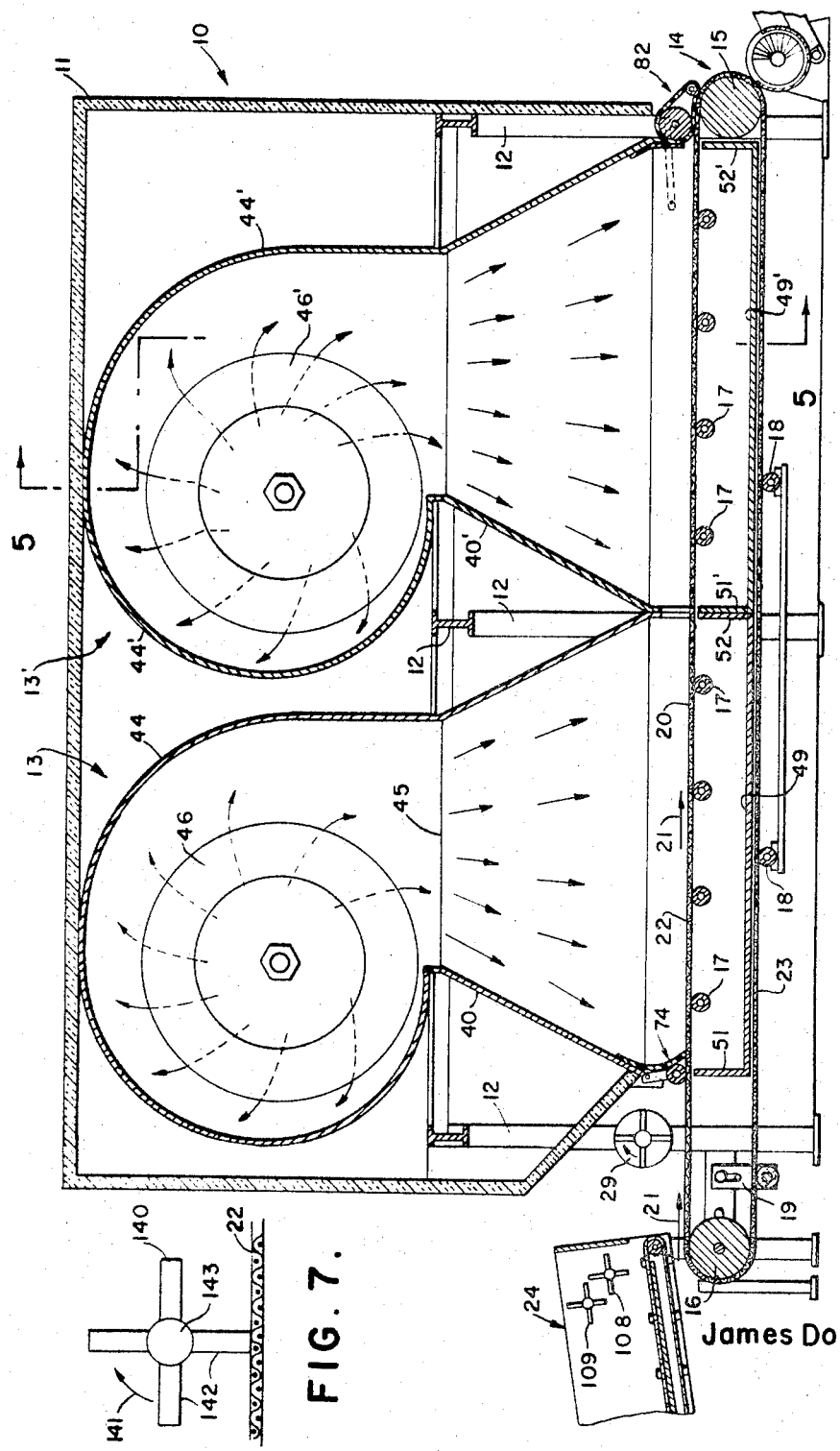
FIG. 4 is a cross sectional view, in side elevation, of the crop dryer taken along lines 4—4 in FIG. 3.

A blower casing 44 is mounted above the reducer 40 with its outlet opening 45 connected to the reducer 40. A backward curved blade blower 46 is rotatably mounted in the blower casing 44 in a position such that the rotation of the blower 46 in a clockwise direction, as shown in FIG. 4, will cause air to be blown through the blower casing 44, through its opening 45, and through the reducer 40. A similar blower casing 44' and blower 46' are mounted above the reducer 40'.

Figure 5:
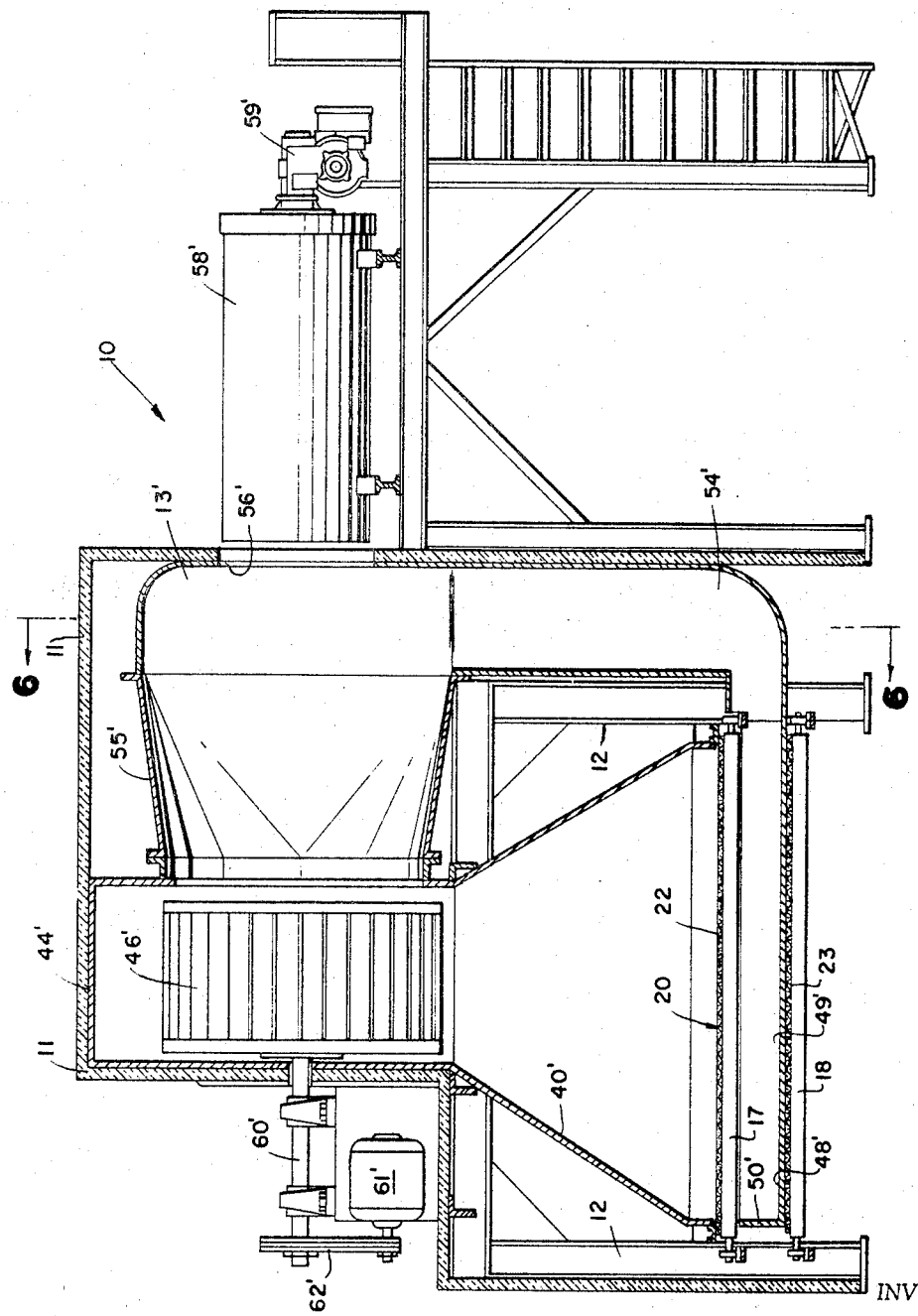
FIG. 5 is a cross sectional view of the crop dryer taken along lines 5—5 of FIG. 4.

Referring now to FIG. 5 which shows the low temperature side 13' of the crop dryer, a rectangular duct 48' is positioned between the flights 22 and 23 of the conveyor belt 20, immediately beneath the reducer 40'. The rectangular duct 48' has a base portion 49' and side portions 50', 51' and 52' (see FIG. 4). The rectangular duct 48 is left open on its side immediately adjacent the upper flight 22 of the conveyor belt 20 and at its end remote from the side 50'. A vertical duct 54 is connected to the opened side of the rectangular duct 48', remote from its side 50', and extends upwardly from the side of the conveyor mechanism, on an angle (see FIG. 6) until it reaches the approximate height of the blower casing 44, whereupon it is connected to reducer 55'. The reducer 55' is connected between the vertical duct 54' and the blower casing 44'. A cylindrical aperture 56' is defined by the walls of the vertical duct 54 and the housing 11 of the crop dryer, the hole being approximately coaxial with the axis of the blower 46'.

A cylindrical combustion chamber 58' is aligned with the hole 56, but slightly displaced therefrom, and a burner 59', of conventional design, is connected to the end of the combustion chamber, remote from the housing 11.

The high temperature side is constructed in an arrangement generally similar with the low temperature side except that the cylindrical combustion chamber 58 is not displaced from the aperture 56.

The blowers 56 and 56' have shafts 60 and 60' and motors 61 and 61' respectively. Conventional driving belts 62 and 62' connect the motors 61 and 61' to the shafts 60 and 60'.

Figure 6:
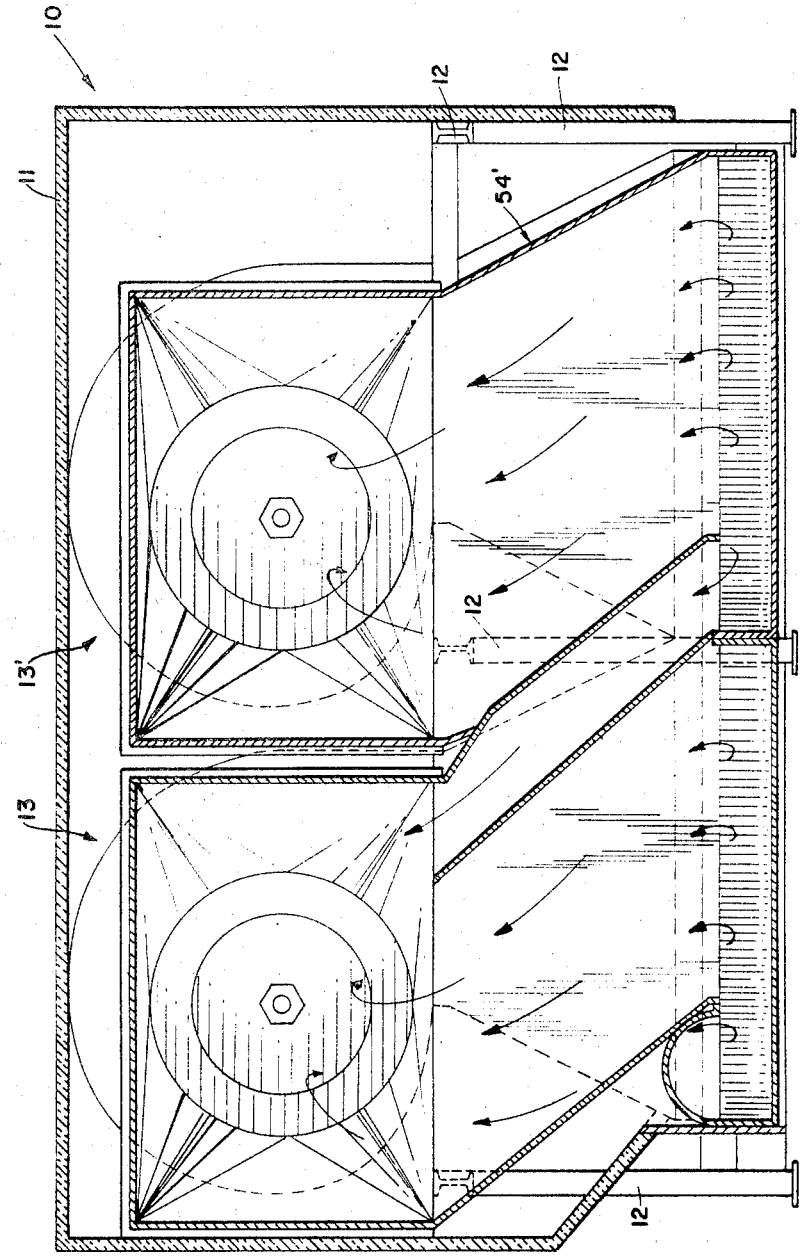
FIG. 6 is a cross sectional view of the crop dryer, similar to FIG. 4, but taken along lines 6—6 of FIG. 3.

As is shown in FIG. 6, a cross-over duct 65 connects the vertical duct 54' near its bottom to the vertical duct 54 near its top.

Figure 2:
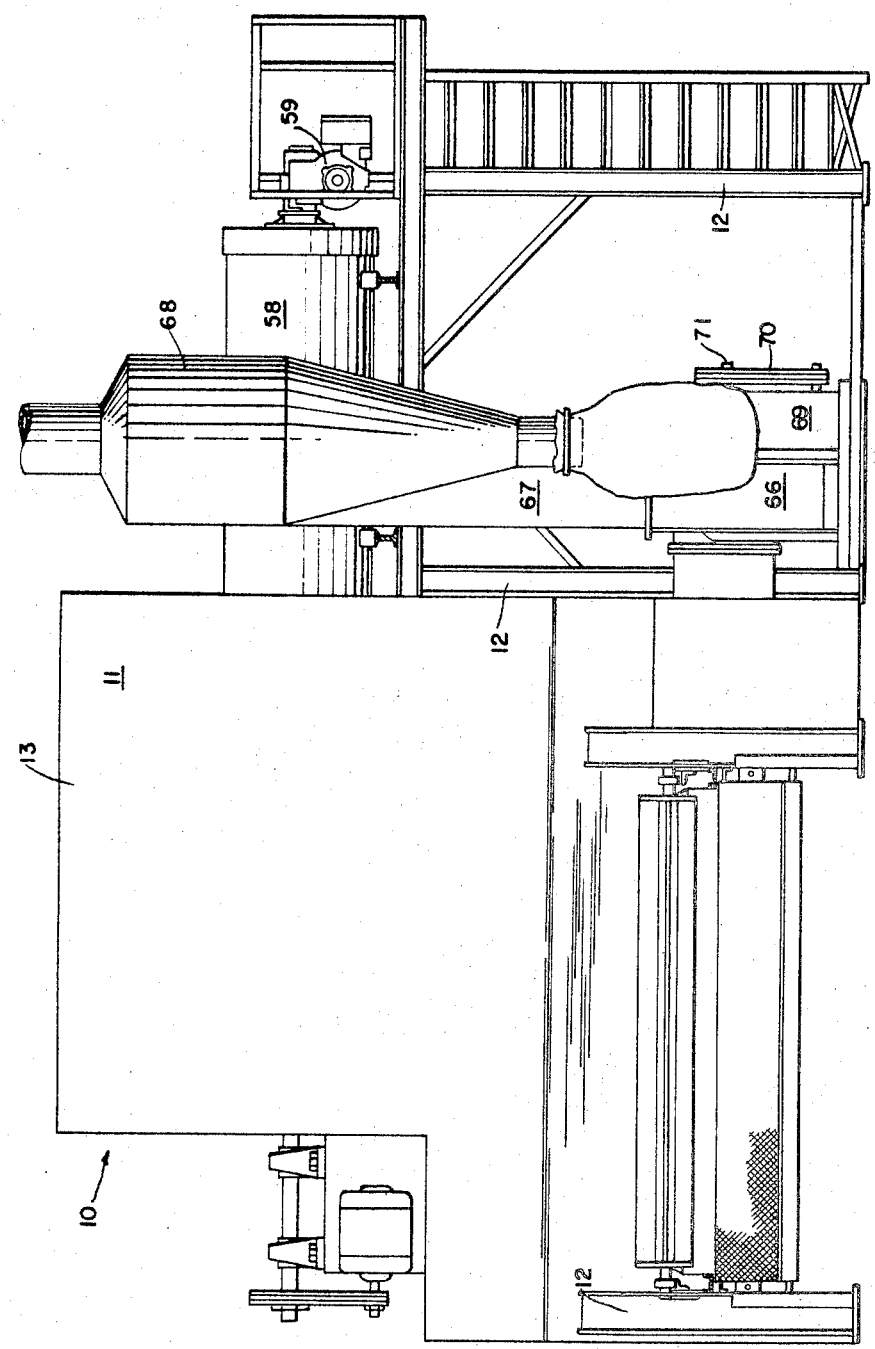
FIG. 2 is a front elevational view of the crop dryer.

As is shown in FIGS. 1, 2 and 3, an exhaust blower 66 has its inlet connected to the vertical duct 54 at its portion closest to the spreader roller 29. The exhaust blower 66 has its outlet connected to the exhaust duct 67, which is connected at its upper end to the cyclone, or centrifuge separator 68. The exhaust blower 66 is driven by a low horsepower motor 69 through the belts 70 and the shaft 71.

Air seals 74 and 82 are positioned at the inlet and the outlet of the crop dryer, respectively, immediately above the conveyor belt 20. The air seal 74, as is shown in FIG. 9, comprises a roller 75, which extends entirely across the width of the conveyor belt 20, and is rotatably attached at its ends to angled bars 76. The angled bars 76 are pivotally attached to the reducer 40 at 77 and a strip of sheet metal extends between the angled bars 76 to form a backing plate 80. A strip of heat resistant material 78, formed from a heat resistant substance such as nylon, is attached to the reducer 40 at a point 79, above the angled bars 76, and extends down to the conveyor belt 20, approximately parallel to the backing plate 77 to form an air seal. Since the upper flight 22 of the conveyor belt is moving in the direction indicated by the arrows 21, the roller will contact the conveyor belt and will rotate about its axis, and when hay is placed on the conveyor belt 20 the roller will roll over it, pivoting about the point 77. Since the heated air above the conveyor belt is at a pressure higher than atmospheric pressure, the strip of material 78 will be forced against the backing plate 80 to prevent the heated air from escaping from the system. The material 78 is of a size so that it is slightly larger than the distance between the conveyor belt 20 and the point 79 so that its lower portion bends to follow the direction of travel of the conveyor.

The air seal 82, as is shown in FIG. 10, comprises a roller 84 that extends across the entire width of the conveyor belt 20 and is rotatably mounted on a pair of bars 85 at its ends. The bars 85 are pivotally attached to the dryer housing at 86 so the roller 85 can pivot, as indicated by the arrow 87. A heat resistant flexible belt 88, formed from a heat resistant substance such as nylon, loosely surrounds the roller 84 and also extends entirely across the width of the conveyor belt 20. A free floating roller 89 is also positioned inside the flexible belt 88. A strip of heat resistant material 90, similar to the strip 78 of the air seal 74, is attached to the reducer 40' and contacts the roller 84.

The roller 84, being rotatable about its own axis and pivotal about the point 86, rests on the surface of the conveyor belt 20, or the hay on its surface, and rotates as the conveyor belt moves thereunder. The flexible belt 88 follows the surface of the roller 84, the surface of the conveyor belt 20 between the rollers 84 and 89, and extends between the roller 89 and roller 84. Since both rollers 84 and 89 lie on the surface of the conveyor belt 20, the belt 88 forms a very effective seal therebetween. Since the heated air inside the crop dryer is at a pressure higher than atmospheric pressure, the strip of material 90 is forced against the surface of the roller 84 and its flexible belt 88 to prevent the heated air from escaping between the reducer 40' and the roller 84.

Figure 11:
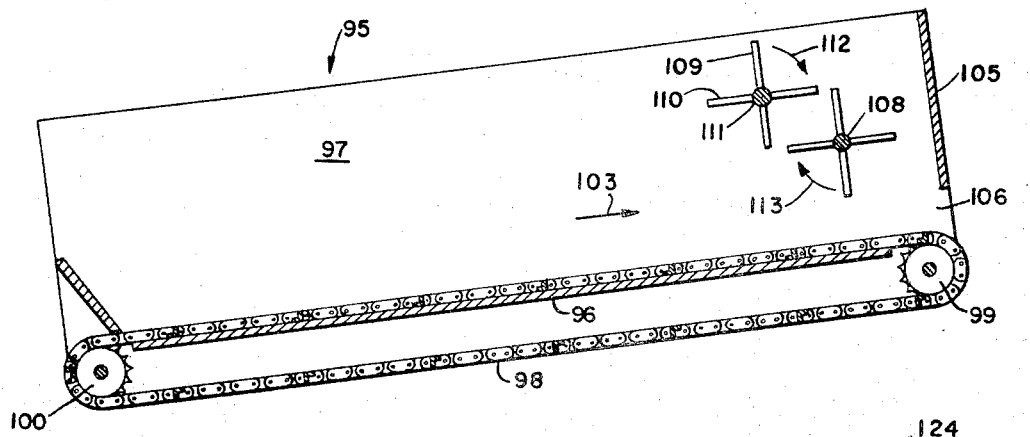
FIG. 11 is a cross sectional view, in elevation, of the feed conveyor.

Referring now to FIG. 11, the feed conveyor 24, which feeds the hay to the conveyor belt 20 and spreader 29, comprises a U-shaped trough 95 having a bottom portion 96 and side wall portions 97. A pair of drag chains 98 mounted on sprockets 99 and 100 at the ends of the bottom portion 96 adjacent the side wall portion 97 of the U-shaped trough 95. A plurality of channel shaped bars 102 (see FIG. 3) extend between the chains 98, and in parallel relationship, at spaced intervals therealong. As the sprockets 99 and 100 are driven by a conventional driving means (not shown) the chains 98 carry the channel shaped bars 102 across the bottom portion 96 in the direction as indicated by the arrow 103, toward the conveyor belt 20. A shield 105 extends between the wall portions 97 above the sprockets 99. A pair of levelers 108 and 109, somewhat similar to the spreader 29 of FIG. 8, are attached to the side wall portions 97 and rotated by the same drive means that drives the sprockets 99 and 100 (not shown). While the levelers 108 and 109 are similar to the spreader 29, the bars 110 are not angled on their axles 111.

When the feed conveyor 24 is in operation, the chains 98 move in the direction indicated by the arrow 103 and the levelers 108 and 109 move in the direction as indicated by the arrows 112 and 113. When a quantity of wet hay is placed in the feed conveyor 24 the channel shaped bars 102 carried by the chains 98 move the lower portion of the hay toward the opening 106 below the shield 105, tending to separate the lower portion of the hay from the upper portion, thereby breaking up and separating any aggregates or wads of hay. Since the upper portion of the hay tends to travel to the right, as shown in FIG. 11, it has a tendency to accumulate near the shield 105. The levelers 108 and 109 push the upper portion of the hay, to the left tending to separate it and toss it about in the U-shaped trough 95, thus, separating the aggregates and wads of hay before it migrates down toward the chains 98 and their channel shaped bars 102 traveling across the bottom portion 96 of the trough. Also, the levelers 108 and 109 tend to toss the hay in the upper portion of the U-shaped trough back toward the left, as viewed in FIG. 11, so that the hay will not accumulate, to an excessive extent, in right portion of the trough.

Operation of the feed conveyor 24 in this manner causes hay to be fed through the opening 106 at a substantially uniform rate in a substantially unpacked condition so that the air in the crop dryer can, subsequently, be easily circulated therethrough.

Figure 13:
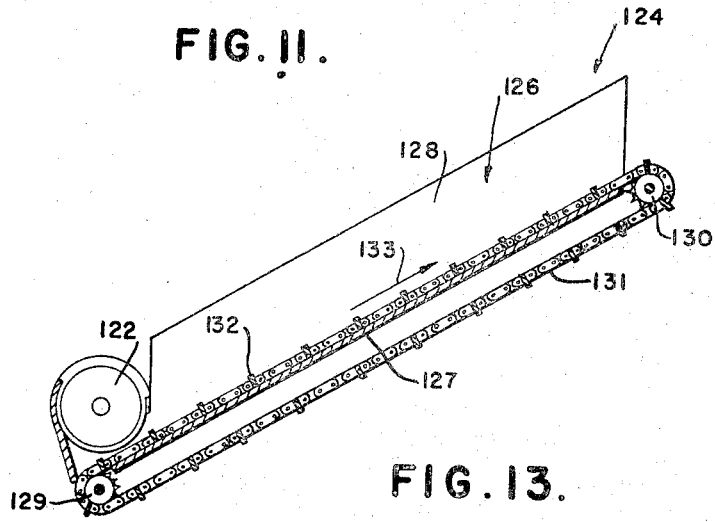
FIG. 13 is a cross sectional view of the outlet conveyor, taken along lines 13—13 of FIG. 12.
Figure 12:
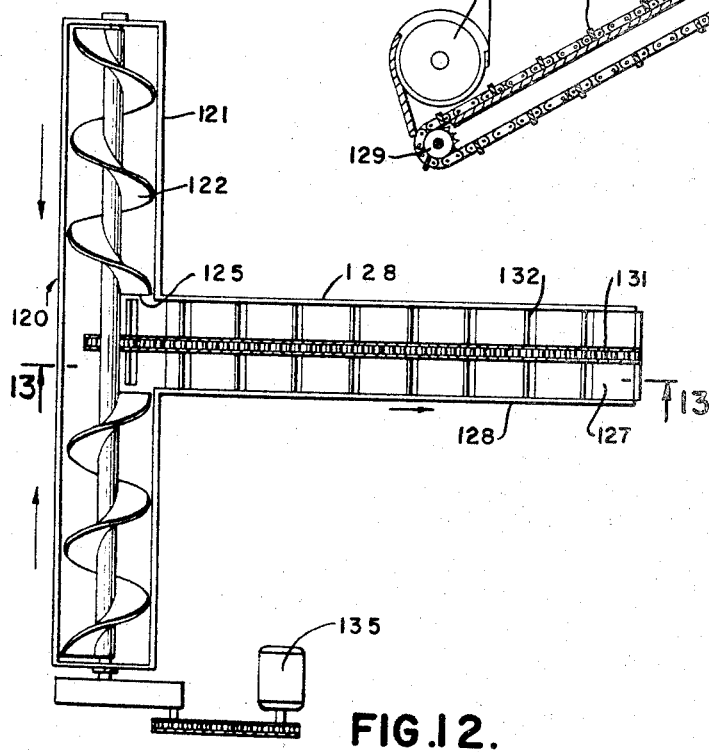
FIG. 12 is a plan view of the outlet feeder.

As is best shown in FIGS. 12 and 13, an outlet feeder 120 is placed at the outlet end of the crop dryer 10 to collect the dried hay and elevate it to a point where it can be collected and retrieved, and removed to a remote point. The outlet feeder 120 comprises a trough 121 that is placed immediately below the roller 15 to catch the hay as it falls off the conveyor belt 20. A central feeding helical conveyor 122 is positioned in the trough 121 and rotated so that the hay collected in the trough 121 is migrated toward its central portion. A conveyor 124, somewhat similar in construction to the feed conveyor 24, is positioned so that it projects into a cut-out portion 125 in the lower portion of the trough 121, to collect the hay gathered at the central portion of the trough, and to convey the hay to an elevated point. The conveyor 124 has a U-shaped trough 126 having a base portion 127 and wall portions 128, sprockets 129 and 130, and a chain 131 extending around the sprockets 129 and 130, and over the base portion 127 of the U-shaped trough 126. A plurality of bars 132 are attached to the chain 131 so that they extend perpendicular to the travel of the chain 131. The bars 132 extend the entire width of the U-shaped trough 126 and travel in the direction as indicated by the arrow 133. The sprocket 129 of the conveyor 124 and the helical conveyor 122 are driven by the motor 135 in a conventional manner.

With this arrangement, it can be seen that as the hay falls from the conveyor belt 20 of the crop dryer it is collected in the trough 121, migrated toward the center of the trough 121 by the helical conveyor 122, dropped onto the conveyor 124 and elevated to a point where it can be easily collected on a vehicle which can be removed to a storage area.

*Operation*

In the operation of the crop dryer, the crop is fed to the conveyor belt 20 adjacent the spreader roller 29 by the feed conveyor 24. The conveyor belt 20 is driven by its driving mechanism 23 in the direction indicated by the arrows 21 and the spreader 29 is driven in the direction shown by the arrow 36. As the crop is carried to the right, as shown in FIG. 4 of the drawing, the spreader 29 tends to spread the crop outwardly over the conveyor belt 20 and level the crop on the belt so that the crop passes through the dryer at a uniform height and evenly spread over the full width of the conveyor belt. After the crop passes beneath the spreader 29 it passes beneath the roller air seal 74 which, if the crop is of sufficient height, pivots out of the way of the crop, but rests on the surface of the crop passing through the dryer preventing air leakage from the duct. Of course, as the crop passes out of the dryer the roller air seal 82 functions in a similar manner.

As the crop passes through the dryer on the conveyor belt 20 the burners 59 and 59' are ignited and their flames occupy the combustion chambers 58 and 58'. The motors 61 and 61' are energized to cause the blowers 46 and 46' to rotate which causes air to circulate throughout the duct system of the crop dryer. The air entering the crop dryer enters through the hole 56' around the combustion chamber 58'. This causes the air entering through the hole 56' to be heated to a temperature of approximately 250° F., but below 260° F., which is the temperature that most crops that will be treated by the present invention will scorch. The burner 59' also introduces some air into the combustion chamber which, of course, is passed into the crop dryer. As the blower 46' rotates at a high velocity a vacuum is created in the reducer 55' between the hole 56' and the blower 46' so that the heat from the combustion chamber 58' and the air passing through the hole 56' and from the recirculation duct enters the blower 46' and is blown out under pressure through the reducer 40'. As the air passes from the blower casing 44' through the reducer 40' it is spread over the surface of the crop immediately beneath the reducer 40'. Since the conveyor belt is of the wire mesh variety the air under pressure from the blower 46' will pass through the crop uniformly since the material is uniform on the belt and the upper flight 22 of the conveyor belt 20 into the rectangular duct 48', between the upper and lower flights of the conveyor belt 20. As the air passes through the upper flight of the conveyor belt it experiences a pressure drop of approximately from 1 to 1½ inches of water. The air blown through the conveyor belt from the blower 46' will be routed through the vertical duct 54' back to the reducer 55' where it will be recycled. Of course, as the air passes the hole 56' more air, which is dryer, will be added thereto.

After the air has been recycled through the low temperature portion 13' of the crop dryer approximately five times, it will be ducted into the cross over duct 65 which connects the lower portion of the vertical duct 54' with the upper portion of the vertical duct 54. At this point the air will be cycled through the high temperature side of the crop dryer.

The high temperature side of the crop dryer functions in a manner substantially similar to the low temperature side except that the combustion chamber 58 on the high temperature side is not spaced away from the housing 11 and the vertical duct 54, so that no external air enters the high temperature side of the dryer between its vertical duct 54 and combustion chamber 58. The only new air entering the high temperature side is the air required to make the burner 59 function properly and that entering from the low temperature section.

As the air recycles through the high temperature side of the crop dryer it is continually heated by the combustion chamber 58 so that its temperature is raised to the range from 400° to 1000° F., depending upon the amount of fuel supplied to the combustion chamber 58 by its burner 59, which is determined by the type and dampness of the crop being treated. Because of the dampness of the crop on the high temperature side the pressure drop of the air as it passes through the conveyor belt 20 is approximately from 2 to 3 inches in water.

After the air has been cycled through the high temperature side approximately five times it is retrieved by the exhaust duct 67 and through the centrifuge separator 68 to the atmosphere.

As the air is blown through the crop and conveyor belt, it can be seen that a small portion of the crop might be forced through the openings in the conveyor belt which might otherwise be lost from the process except for the rectangular ducts 48 and 48'. These rectangular ducts catch the portion of the crop blown through the conveyor belt and the air in the system carries the lost portion of the crop back through the vertical duct 54 and 54', through the blowers 46 and 46' and back down to the crop being conveyed through the dryer. Accordingly, that portion of the crop being blown through the belt is retrieved and saved. Furthermore, as the exhaust blower 66 retrieves the wettest air from the system any smaller particles of the crop that might be entrained in the air will be separated from the exhausted air in the centrifuge separator 68. The air being blown through the exhaust duct 67 is channeled through the centrifuge separator 68 so that the air is exhausted from the top of the separator and the crop falls to the bottom thereof where it is collected in a bag. Thus, it can be seen that very little, if any, of the crop is lost in the process.

It should also be noted that the heated air moves generally in one direction while the crop is conveyed in the opposite direction so that the air is progressively heated as it travels through the system and the crop. Thus, when the crop is in its wettest condition it is initially treated with the hottest air in the system, and as the crop travels through the dryer the air becomes dryer. The drying air on the high temperature side of the crop dryer can be heated to a temperature greatly beyond the scorching temperature of the crop to dry the crop since the crop is wet as it enters the dryer and its moisture tends to insulate the crop and prevent its scorching. As the crop travels through the dryer it travels toward the lower temperature zone which has air of lower temperature and lower humidity so that as the crop dries out and its danger of scorching is more likely, the air is reduced in temperature, but its effectiveness in the drying operation is maintained since its humidity is reduced and its velocity is increased due to a lower pressure drop in the air as it passes through the conveyor belt.

As best illustrated in FIG. 6, the material travels from left to right, as the drying air travels generally from right to left. The material in the high temperature section, the left portion of the figure, is very wet while that in the low temperature section, in the right portion of the figure, is almost dry. Therefore, the air moving down through the material in the right portion or low temperature section will drop in temperature only slightly since the hay in this portion is almost dry. As this air is recirculated and reheated, a portion thereof, approximately 20%, is retrieved by the cross-over duct 65 and ducted into the high temperature section. Of course, this air is replaced by the air being pulled in through the aperture 56'. The amount of recirculated air is adjusted by the amount of inlet air and exhausted air. The air in the high temperature section, like the air in the low temperature section, moves downward through the bed of hay and is recirculated through the blower. Although the air is reheated on each cycle, the air that travels through the material at the extreme left portion of FIG. 6, where the material initially enters the dryer, is low in temperature since it has just traveled through the wet and cold incoming material. Since the outlet from the crop dryer leading to the exhaust blower is located at this point, this cool wet air is exhausted through the exhaust blower to the atmosphere. Since the wettest and lowest temperature air is removed from the dryer, the efficiency of the dryer is very high (estimated at 80%), which is in contrast to other known dryers, whose maximum efficiencies are estimated at 60%.

FIG. 7 shows an optional addition to the invention which comprises an agitator 140 that can be positioned at any point or at several points along the length of the conveyor belt 20. The agitator 140 is positionable immediately above the upper flight 22 of the conveyor belt and arranged to rotate in the same direction as the driving roll and driven roll 15 and 16 as indicated by the arrow 141. The agitator 80 comprises paddles 142 extending across the width of the conveyor belt and being rotatably attached to the dryer housing. The agitator is constructed to scoop up portions of the crop so that it passes over the agitator and falls down on the conveyor belt 20. In this manner, the crop will be moved or agitated so that the danger of scorching the upper surface of the crop, especially in the high temperature portion of the dryer, is reduced. Also, in the event that the crop has been placed on the conveyor belt in a highly dampened condition, whereupon it might tend to become packed, the agitator 80 has the function of breaking up any clods or aggregates of the crop so that pockets of moisture will not be carried through the dryer.

At this point, it should be obvious that the invention discloses a high-speed efficient process of drying crops whereupon the air utilized to dry the crop is repeatedly recycled through the apparatus so that a minimum of heat is required in the drying process. While the dryer is constructed to dry the wettest of crops, it can also be utilized with crops that have a low moisture content by merely reducing the temperature of the heated air in the system by reducing the fuel consumption of the burners. Also, because of the arrangement of the conveyor belt and the blow-through process, it can be seen that crops of any form can be dried, for instance, chopped or unchopped crops or even broad leafed crops.

It will be obvious to those skilled in the art that many variations may be made in the embodiments chosen for the purpose of illustrating the present invention without departing from the scope thereof as defined by the appended claims.

What is claimed as invention is:

1. A method of drying crops in a drying apparatus comprising a housing defining an inlet opening and an outlet opening, an endless apertured conveyor belt including an upper flight movable from the inlet opening toward the outlet opening and having one end portion extending through the inlet opening and the opposite end portion extending through the outlet opening, and means dividing the area above and below said upper flight of the conveyor belt transversely of the path of the flight into a first zone adjacent the outlet opening and a second zone adjacent the inlet opening; said method comprising: introducing a quantity of air into the first zone and passing the air through the portion of the upper flight of the conveyor belt in the first zone, recycling the air through the upper flight of the conveyor belt, heating the air as it is introduced to and recycled in the first zone, ducting a portion of the air in the first zone into the second zone, passing and recycling the air in the second zone through the portion of the upper flight of the conveyor belt in the second zone, heating the air in the second zone to a temperature higher than that of the first zone, and exhausting air from the second zone.

2. A method of drying grainy substances comprising:
conveying a crop on an open mesh belt conveying means from a first point to a second point,
passing a quantity of air through the crop and the conveying means in the vicinity of the second point,
recycling the quantity of air through the crop and the conveying means in the vicinity of the second point,
heating the air on each cycle in the vicinity of the second point,
transferring at least a portion of the air from the vicinity of the second point to the vicinity of the first point,
passing the air transferred to the vicinity of the first point through the crop and the conveying means in the vicinity of the first point,
recycling the air through the crop and the conveying means in the vicinity of the first point,
heating the air on each cycle in the vicinity of the first point, and
removing the air from the vicinity of the first point.

References Cited

UNITED STATES PATENTS

| 1,264,955 | 5/1918 | Mason. | |
| 2,350,209 | 5/1944 | Clark et al. | 34—31 XR |
| 2,415,738 | 2/1947 | Freund | 34—216 |
| 2,659,161 | 11/1953 | Eaves | 34—31 |
| 3,281,958 | 11/1966 | Lambert et al. | 34—216 XR |

KENNETH W. SPRAGUE, *Primary Examiner.*